United States Patent [19]

Loranger et al.

[11] 4,399,481
[45] Aug. 16, 1983

[54] LOCKOUT DEVICE FOR TAPE CASSETTE

[75] Inventors: Robert T. Loranger; John P. Loranger; John R. Peltz, all of Warren, Pa.

[73] Assignee: Loranger Manufacturing Company, Warren, Pa.

[21] Appl. No.: 253,701

[22] Filed: Apr. 13, 1981

[51] Int. Cl.³ .................. G11B 15/04; G11B 23/04
[52] U.S. Cl. ................................. 360/132; 360/60
[58] Field of Search .................. 360/132, 60; 242/199

[56] References Cited

U.S. PATENT DOCUMENTS

| | | | |
|---|---|---|---|
| 3,686,470 | 8/1972 | Stahlberg | 360/132 |
| 4,012,011 | 3/1977 | Saito | 360/60 |
| 4,320,421 | 3/1982 | Larson et al. | 360/132 |
| 4,320,422 | 3/1982 | Rinkleib | 360/60 |

FOREIGN PATENT DOCUMENTS 2604172  8/1977  Fed. Rep. of Germany ...... 360/132

Primary Examiner—Alfred H. Eddleman
Attorney, Agent, or Firm—Charles L. Lovercheck; Wayne L. Lovercheck; Dale R. Lovercheck

[57] ABSTRACT

A means whereby a captive movable member is placed in a tape cassette shell aperture. This captive means can be manipulated by the user to effectively block the access of the record lockout lever or allow it to penetrate the cassette shell. Thus the user of the cassette can prevent the accidental erasure or re-recording of the cassette tape when the movable member is in the retracted position, but can deliberately allow re-recording by positioning the movable member to the extended position.

2 Claims, 5 Drawing Figures

LOCKOUT DEVICE FOR TAPE CASSETTE

GENERAL DESCRIPTION OF INVENTION

A means whereby a captive, movable member is placed in the cassette shell aperture is described herein. This member can be manipulated by the user to effectively block the access of the record lock-out lever, or allow it to penetrate the cassette shell. Thus, the owner of the cassette can prevent the accidental erasure or re-recording of the cassette tape when the movable member is in the retracted position, but can deliberately allow re-recording by positioning the movable member to the extended position. One method of achieving the aforementioned action is to place a rotary cam or gate device in the aperture whose axis of rotation is at right angles to the plane of the cartridge. In position (a), shown in FIG. 3, the periphery of the cam effectively blocks the aperture, thus allowing recording and re-recording. In position (b), shown in FIG. 5, the cutaway portion of the cam allows the penetration of the record lock-out lever for the player, thus preventing erasure or re-recording of the tape.

REFERENCE TO PRIOR ART

Applicant is aware of the following United States prior act.

U.S. Pat. No. 3,980,256 shows a shiftable tab for selectively blocking the opening formed by the removal of the conventional knockout tab used to provide a means for determining the presence of predetermined material on the tape carried by the cassette. Applicant's invention provides an improved captive member for performing this function in a more efficient manner than that of the reference. The other references merely show the state of the art of tape cassettes.

OBJECTS OF THE INVENTION

It is an object of the invention to provide an improved tape cassette.

Another object of the invention is to provide an improved apparatus for preventing re-recording of a tape cassette.

Another object of the invention is to provide an improved tape cassette that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
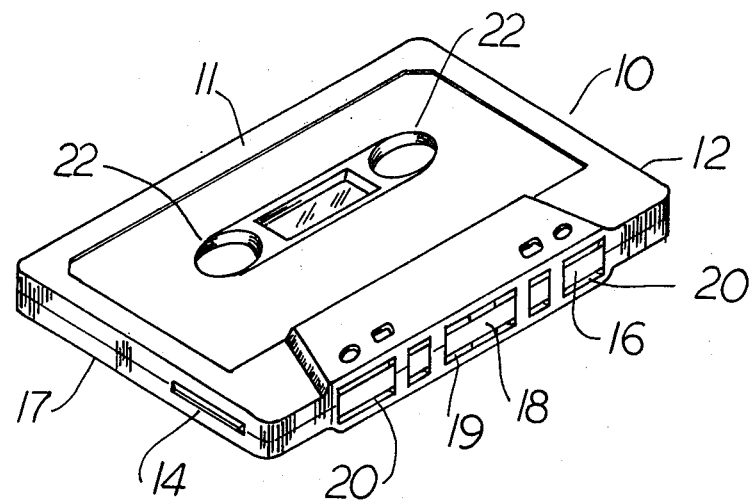
FIG. 1 is an isometric view of a tape cassette according to the invention.
Figure 2:
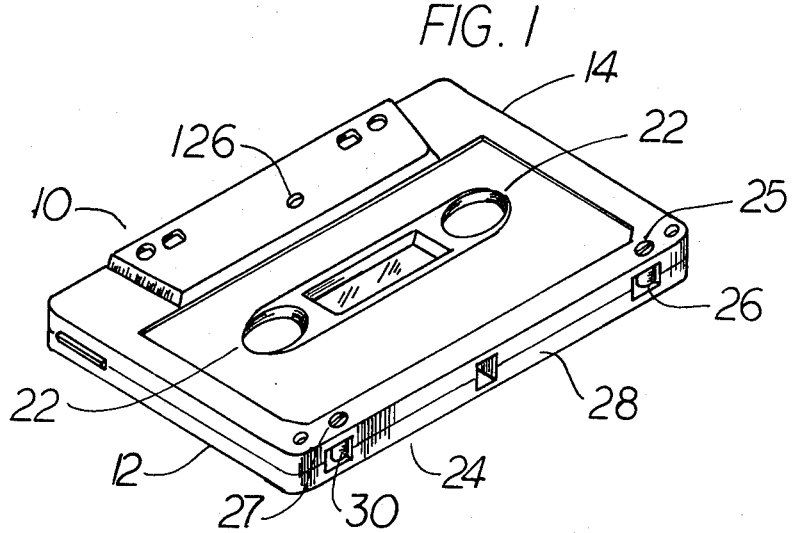
FIG. 2 is an isometric view of a tape cassette shown in FIG. 1 flipped over.

The tape cassette utilizing improvements on the present invention is broadly shown and denoted by the Numeral 10. The improvements can be applied to a Phillips type cassette like that shown in U.S. Pat. No. 3,980,256. It can also be used in a variety of different designs of cassettes of which the Phillips cassette is but one example. The cassette 10 shown has a case 11 made up of a top shell 12 and a bottom shell 14. Shells 12 and 14 are held in spaced relation to each other by webs 15 which are integral with the shells 12 and 14 and provide a space for the hubs 22 to freely rotate between the shells.

The magnetic tape 16 is supported on the hubs in a conventional manner and is exposed through the opening 19 to a transducer on the tape recorder along the front of the cassette.

Figures 3, 4, 5:
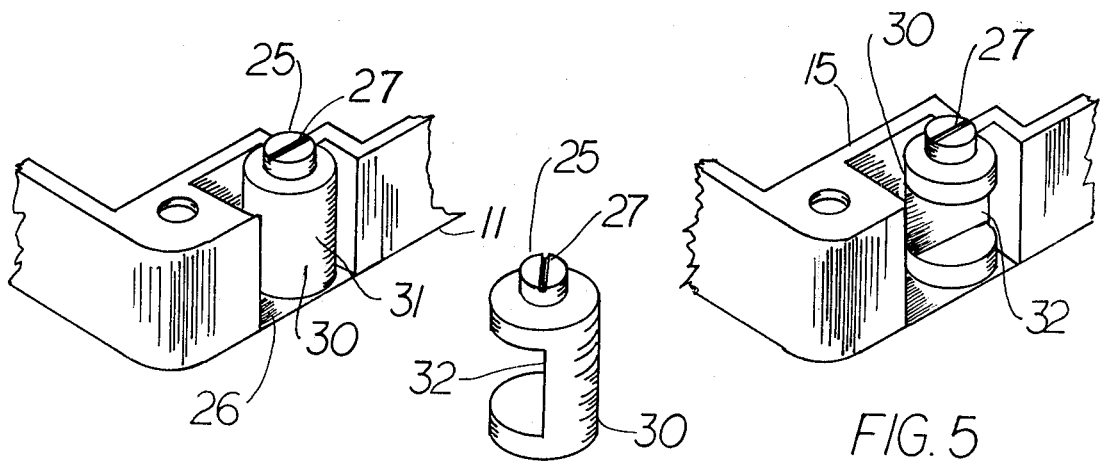
FIG. 3 is an enlarged partial perspective view of one corner of the cassette showing the rotary disabling member according to the invention moved to the disabling portion.
FIG. 4 is a perspective view of the rotary cam disabling member.
FIG. 5 is a view similar to FIG. 3 showing the rotary cam disabling member in non-disabling position.

The rotary cam 30 is supported in the recesses 26. The rotary lock-out cam 30 are generally in the form of a cylinder having approximately one half of the cylinder cut away providing a half cylindrical surface and a flat surface 32, therein providing a recess for the disabling element on the tape machine to enter as best shown in FIG. 5. It will be seen that when the rotary lock-out member 30 is rotated to the position shown in FIG. 3 the record lock-out lever of the tape player will be held from entering the recess thus preventing erasure of the tape or re-recording of the tape.

The embodiment shown is the preferred embodiment of this invention but other forms of a moveable lock-out cam can be used. The rotary cam lock-out members each have a hub 25 on each end and one of the hubs 25 has a screwdriver slot 27 in it which extends through the shell and can be entered by a suitable screwdriver or coin for rotating it.

When the cylindrical periphery 31 of the cam lock-out member 30 is rotated to the position shown in FIG. 5 the cut away side of the rotary cam lock-out member will face outwardly and the flat surface 32 will be down in the recess 26 and allow the record lock-out lever of the tape player to penetrate the recess 26 and allow the player to operate.

Thus, when the rotary lockout cam 30 is rotated to the position shown in FIG. 3, re-recording cannot take place, but when the rotary lockout cam 30 is rotated to the position shown in FIG. 5, the tape can be re-recorded.

The foregoing specification sets forth the invention in its preferred, practical forms but the structure shown is capable of modification within a range of equivalents without department from the invention which is to be understood is broadly novel as is commensurate with the appended claims.

The embodiment of the invention in which an exclusive property or privilege is claimed are defined as follows:

1. In a tape cassette: a cassette housing formed of a pair of shells with each shell having a pair of spaced opposite sides, the shells being disposed in operative position adjacent to each other with respective sides thereof in alignment with each other;

and means for interconnecting the shells when the latter are in operative position to form said housing, a web on and extending along each side of said housing, holding said shells in spaced relation to each other, a movable cylindrical captive member disposed in a cassette shell aperture, said aperture having two generally parallel flat side surfaces, said member being adapted to be manipulated by the user to effectively block the access of a record lock-out lever, or allow said lever to penetrate the cassette shell, whereby the user can prevent the accidental erasure or re-recording of the tape when the movable member is in the retracted position, but can deliberately allow re-recording by positioning the movable member to the extended position, and selectively manipulate the captive member to block access of said lock-out lever, said captive member comprising an elongated body having a central axis disposed perpendicular to said spaced shells and a hub on one end of said captive member extending through an opening in one of said spaced shells and means on said captive member to rotate said captive member, a notch formed in said cylindrical member comprising spaced ends of said notch adjacent the flat ends of said captive member, generally perpendicular to the central axis of rotation of said cylindrical body, said flat ends extending from one side of said captive member through the central axis of said captive member and terminating between said central axis and the opposite side of said captive member, said notch having a generally flat bottom disposed in a plane generally parallel to a plane tangent to said cylindrical surface and intersecting the outer cylindrical surface at each side thereof, said notch being adapted to receive said lock-out lever when said captive member is rotated.

2. In combination, a tape cassette having two spaced shells and lock-out device for preventing actuation of the tape player by a lockout lever on the tape player, said cassette having a recess therein, a movable lock-out member in said recess supported on said cassette, said movable lock-out member having an elongated cylindrical body having its central axis disposed perpendicular to said spaced shells and a hub on one end extending through an opening in one of said spaced shells and a notch formed in said elongated body comprising spaced ends and a generally flat bottom, said generally flat bottom being planar and extending entirely across said cylindrical body, said flat ends of said notch extending adjacent the ends of said body and generally perpendicular to the central axis of rotation of said body, said flat ends extending from one side of said body through the central axis of said body and terminating at said generally flat bottom between said central axis and the opposite side of said body providing a recess to receive said lock-out lever and adapted to selectively move into the path of said lock-out lever and to move out of the path of said lever whereby said recorder is prevented from re-recording the tape in said cassette or selectively permitted to record.

* * * * *